June 28, 1960  W. C. KLANK ET AL  2,942,610
TANK FOR LIQUID CIRCULATING SYSTEM OF VEHICLES
Filed June 17, 1957  2 Sheets-Sheet 1
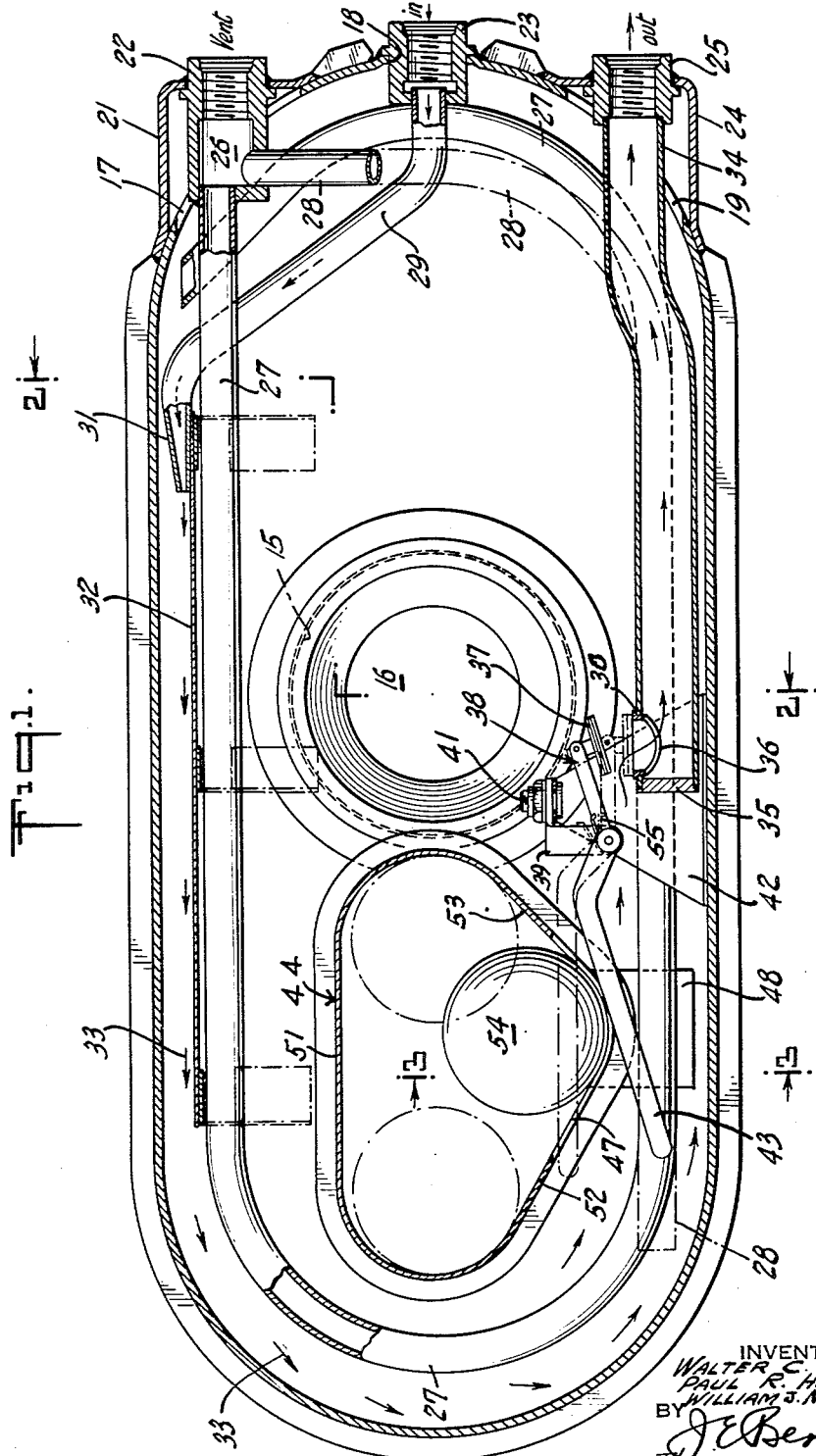
INVENTORS:
WALTER C. KLANK
PAUL R. HUGHES
WILLIAM J. NEUBERG, JR
BY
J.E. Beringer
Their ATTORNEY June 28, 1960 W. C. KLANK ET AL 2,942,610
TANK FOR LIQUID CIRCULATING SYSTEM OF VEHICLES
Filed June 17, 1957 2 Sheets-Sheet 2
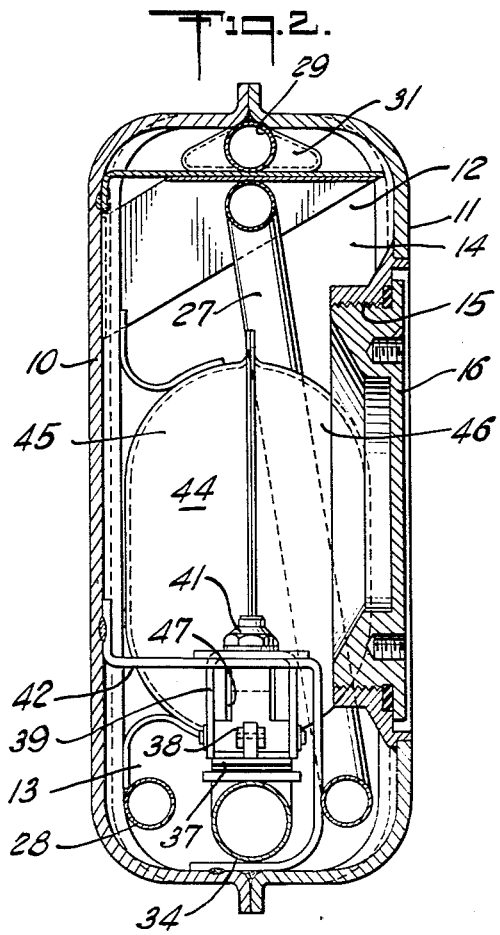
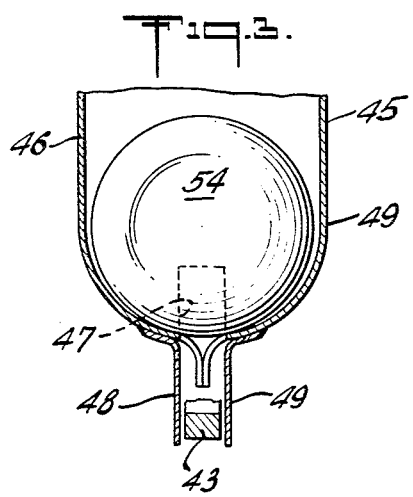
INVENTORS:
WALTER C. KLANK
PAUL R. HUGHES
WILLIAM J. NEUBERG, JR.
BY
their ATTORNEY.

2,942,610

Patented June 28, 1960

2,942,610

TANK FOR LIQUID CIRCULATING SYSTEM OF VEHICLES

Walter C. Klank, Dayton, Paul R. Hughes, Englewood, and William J. Neuberg, Jr., Dayton, Ohio, assignors to United Aircraft Products, Inc., Dayton, Ohio, a corporation of Ohio Filed June 17, 1957, Ser. No. 666,054

7 Claims. (Cl. 137—43)

This invention relates to liquid circulating systems, especially in aircraft, and particularly to tanks interposed in such systems for storage, dwell and like purposes.

In systems of the kind with which this invention is concerned, a liquid such as oil is drawn from a supply tank and utilized in the application of hydraulic pressures, the operation of hydraulic drives and in the lubrication of engine parts. From the places of utilization, the liquid is returned to the tank for reuse. In returning to the tank, the liquid entrains varying amounts of air, and, in some installations, the amount of entrained air increases to critical proportions when the aircraft is a dive or a climb, or is inverted. Heavily aerated oil is conducive to turbulence within the tank and unless a considerable amount of the air is removed before the oil leaves the tank, misoperation may result, as for example cavitation of hydraulic pumps or improper lubrication.

An object of the instant invention is to provide a tank interposed in a liquid circulating system in aircraft, and equipped for efficient deaeration of the liquid passing therethrough.

Another object of the invention is to provide a constantly open, large size vent, in a tank as described, which serves to vent the tank in either a normal or an inverted flight attitude without draining the liquid from the tank.

A further object of the invention is to provide a valve controlled tank outlet subject to gravity control in such wise that said outlet is open in normal flight attitudes and is closed in inverted flight and in climbing and diving attitudes of predetermined angle.

Other objects and structural details of the invention will appear from the following description when read in connection with the accompanying drawings, wherein:

Fig. 1 is a view in longitudinal section of a tank in accordance with the illustrated embodiment of the invention, the parts being shown in the position occupied in a normal flight attitude;

Fig. 2 is a view in cross section taken substantially along the line 2—2 of Fig. 1; and Fig. 3 is a fragmentary view in cross section, taken substantially along the line 3—3 of Fig. 1.

Referring to the drawings, a tank in accordance with the illustrated embodiment of the invention is made up of mating sheet metal members 10 and 11 which have their longitudinal edges turned over as flanges. The members are arranged in parallel, opposed relation with their turned over edges in contact with one another. Welds at such contacting edges hold the parts of the tank in a unitary, assembled relation. A generally rectangular tank interior 12 is so defined.

The tank shell as defined by the parts 10 and 11 is adapted to be strapped or otherwise secured in a detachable manner to the air frame or to relatively stationary parts attached thereto. The tank accordingly has motion with the aircraft. In an installed position, moreover, the interior 12 of the tank may be considered as comprising a normal lower portion 13 and a normal upper portion 14, respectively below and above the medial horizontal plane of the tank. The tank also may be considered as having a leading end and a trailing end, having regard to the direction of travel of the aircraft.

In one side of the tank is an access opening 15 normally closed by a screw cap 16. At one end of the tank, in the present vertically spaced end, the tank shell is formed with vertically spaced apart openings 17, 18 and 19. The opening 17 is located in the normal upper portion of the tank and is covered by a cup 21 in which is installed a cylindrical fitting 22. A cylindrical fitting 23 is installed in the opening 18. The opening 19 is covered by a cup 24 in which is a cylindrical fitting 25. The respective fittings 22, 23 and 25 open to the exterior of the tank and their outer open ends are internally threaded to receive pipe connections. The connection from fitting 22 is to a low pressure, venting area, as for example to atmosphere or to the scavenger side of the engine lubricant circulating system. The connection from fitting 23 is to a source of liquid under pressure. The connection from fitting 25 is to a place of utilization of the liquid contained within the tank. Fitting 22 thus represents the air vent for the tank. Fitting 23 is the liquid inlet and fitting 25 is the liquid outlet.

At the inner end of fitting 22 is a chamber 26 in common communication with the ends of respective tubes 27 and 28. The former extends from the chamber 26 longitudinally through the normal upper portion of the tank to the rear or trailing end thereof and then downwardly to the normal lower portion of the tank and longitudinally forward in this portion. Finally, at the leading end of the tank, the tube 27 returns upward into the normal upper portion thereof and near the top of the tank terminates, such terminating end being open as indicated. The tube 28 extends downward from the chamber 26 to the normal lower portion of the tank and extends rearwardly therein to a terminus at the rear or trailing portion of the tank. The terminal end of the tube 28 also is open into the tank interior.

The inner end of fitting 23 is in communication with one end of a tube 29. The latter extends from the fitting 23 upwardly within the tank and terminates in a laterally expanded nozzle formation 31 overlying a horizontal table or baffle 32 stationarily mounted within the tank in the normal upper portion thereof near the top wall of the tank. The nozzle formation 31 overlies one end of the baffle table 32 and is adapted to discharge liquid received by way of the fitting 23 and tube 29 rearwardly or longitudinally along the table toward the opposite end thereof, the liquid being spread out by the nozzle formation in a relatively wide and flat stream conducive to a ready release of entrained air. Leaving the table 32, the liquid is free to descend within the tank, in the manner indicated by the arrows 33.

The inner end of the fitting 25 communicates with one end of a tube 34 which extends longitudinally within the normal lower portion of the tank and terminates at about the mid portion thereof. The inner or terminal end of the tube 34 is closed by an insert member 35. Near such terminal end, in the upper portion of the tube 34, is a port 36, communicating the tube 34 with the interior of the tank.

According to the construction and arrangement of parts, as described, the circulating liquid enters the instant tank by way of fitting 23, is directed to table 32 over which it flows for a better release of entrained air. The liquid then descends or settles in the tank, moving toward the port 36 whence it is carried by tube 34 to outlet fitting 25. The settling liquid continues to release air therefrom and when it reaches the port 36 is at a minimum aeration. The released air travels to the upper part of the tank interior. There it is free to enter the open upper end of the tube 27 and be conducted thereby to the open vent fitting 22. In inverted flight, the open end of the tube 27 is covered with liquid. The open end of the tube 28 is at this time uncovered, however, so that venting may take place by way of this tube. It may be observed that, although the construction provides for a continuously open vent, the arrangement provides for a minimum loss of liquid out of the vent. Thus, in normal and in inverted flight attitudes the liquid cannot drain to the vent since the open end of the submerged tube 28 or 27 is spaced from the vent by approximately the full height of the tank. In climbing and diving attitudes of flight, there may be lost to the vent only the quantities of liquid which may be within the tubes, or within parts thereof.

The outlet port 36 in the tube 34 is adapted alternatively to be opened and closed by a valve 37 arranged to seat on an annulus 30 in surrounding relation to the port 36. The valve 37 is on one end of a lever 38 pivotally supported between its ends by the dependent arms of a generally U-shaped frame member 39 which is in turn secured by a bolt 41 to an irregularly shaped bracket 42 welded to the tank shell. Beyond its pivotal support 39, the lever 38 extends as an elongated arm 43 longitudinally toward the rear of the tank and in underlying relation to a cage 44. The latter is made up of mating sections 45 and 46, one or both of which is welded to the side of the tank shell so that the cage 44 is made stationary relatively to the tank. In the bottom of the cage 44 is a longitudinal slot 47 receiving the lever arm 43. Dependent guides 48 and 49 limit relative lateral motion of the arm 43. In longitudinal section, the cage 44 has approximately the shape of an inverted triangle, with the opening or slot 47 occurring at the apex thereof. Accordingly, the upper part of the cage is formed as a generally planar wall 51 while at opposite sides thereof are divergently inclining walls 52 and 53. The inclined walls 52 and 53 serve as tracks for a freely movable metal ball 54 contained within the cage 44. The ball and cage are of such relative sizes as substantially to inhibit relative lateral motion of the ball while permitting freedom of longitudinal motion thereof and freedom for the ball to drop from the apex portion thereof to the base or planar portion 51. Under the influence of gravity, the ball 54 normally rests in the position shown in full lines in 54 in the bottom or apex portion of the cage on or over the slot 47. The weight of the ball is such as to displace the arm 43 from the slot with the result that the lever arm and the lever 38 of which it is a part are held rocked substantially in the position illustrated in full lines where the valve 37 is lifted to an open position relatively to the port 36. Under this condition, therefore, the port 36 is open and liquid within the tank may flow freely therefrom. In an inverted attitude of flight, the ball 54 drops downward upon the wall 51 thereupon releasing the lever arm 43 which under the influence of a torsion spring 55 rocks in a clockwise direction to seat the valve 37 upon the annulus 30 and thereby close the port 36. In an inverted attitude of flight, therefore, the liquid outlet from the tank is closed. Similarly, a climb attitude of sufficient angle will cause the ball 54 to roll up the track 52, leaving its position in the bottom of the cage 44 and releasing the arm 43 to close the valve 37. A diving flight attitude may permit the ball to roll up the track 53 and likewise to release the arm 43 for closure of the valve 37. Hence, in diving and climbing attitudes of predetermined angle, liquid flow out of the tank is interrupted and is not resumed until the aircraft returns to approximately a normal flight attitude. It will be understood that the inclination of the tracks or walls 52 and 53 is selected to achieve closing of the valve at a predetermined angular position of the aircraft, and this in turn will be a function of the climb or dive position at which the level of air entrained in the liquid returning to the tank becomes critically high. The slope or inclination of the tracks 52 and 53 are thus selected to achieve closing of the valve 37 at determined, critical attitudes of flight.

Closing of the port 36 blocks the outlet of liquid from the tank. A continuing supply to the tank, in excess of the capacity thereof, may be compensated for by external by-pass means or by merely permitting the excess liquid to escape by way of the vent 22, the vent fitting being in this instance connected to a low pressure part of the circulating system, as for example the inlet side of the engine scavenger pumps.

While, as noted, the instant invention may be embodied in a storage tank in liquid circulating systems as described, it is in the illustrated instance embodied in a relative smaller, intermediate dwell tank interposed in the system beyond the storage tank and in advance of the engine or other place of use to insure the availability, as the aircraft emerges from an inverted, steep climbing or diving attitude of a supply of whole, substantially air free liquid.

What is claimed is:

1. A tank in a liquid circulating system, said tank having normal upper and lower portions, a liquid inlet to said tank, a liquid outlet communicating with the normal lower portion of the tank, a valve controlling said outlet, a spring urging said valve closed, a lever arm connected to said valve, a ball cage stationarily mounted in said tank and having divergently inclining tracks said cage having an opening at the junction of said tracks, and a freely rolling ball in said cage tending normally to occupy a position at the junction of said tracks projecting through said opening to engage and hold actuated said lever arm in a position opening said valve, tilting motion of the tank in a direction and of an extent to cause said ball to ride up one of said tracks serving to release said arm whereby to permit said valve to close.

2. A tank according to claim 1, characterized in that said cage is shaped substantially to hold said ball against lateral motion and to retain the ball within the cage in an inverted tank attitude, the slope of said tracks being determined for release of the lever arm at selected angles of tilt.

3. A tank in a liquid circulating system, said tank having normal upper and lower portions as well as normal leading and trailing portions, a liquid inlet to the tank, a liquid outlet therefrom communicating with the normal lower portion of the tank, a vent in said tank located in the leading end thereof in the normal upper portion of the tank, a first conduit communicating at its one end with said vent and at its other end with the interior of the tank in the normal upper portion thereof, said first conduit extending from said vent across the normal upper portion of the tank to the trailing end thereof and then downward to the normal lower portion of the tank and finally reversely upward to the normal upper portion, and a second conduit communicating at its one end with said vent and at its other end with the interior of the tank in the normal lower portion at the trailing end thereof.

4. A tank according to claim 3 characterized by a valve controlling said liquid outlet.

5. A tank in a liquid circulating system, said tank having normal upper and lower portions, a liquid inlet to said tank, a liquid outlet communicating with the normal lower portion of the tank, a valve controlling said outlet, a spring urging said valve closed, an actuating part connected to said valve and deflectable to open said valve, a ball cage stationarily mounted in said tank, said cage having vertical parallel sidewalls and at the bottom thereof an opening overlying said actuating part, said cage further having opposing tracks inclining divergently from said opening, and a freely rolling ball in said cage tending normally to occupy a position of registry with said opening to engage and deflect said actuating part and hold said valve open, tilting motion of the tank in a direction and of an extent to cause said ball to ride up one of said tracks serving to release said actuating part whereby to permit said valve to close, the vertical walls of said cage confining said ball against lateral motion from said tracks.

6. A tank in a liquid circulating system, said tank having normal upper and lower portions, a liquid inlet to the tank, a liquid outlet therefrom, a vent chamber in direct communication with the exterior of the tank and closed from direct communication with the interior of the tank, and a pair of conduits relatively stationarily installed in said tank, one communicating at its one end with said vent chamber and at its other end with the tank interior in the normal upper portion of the tank, and the other communicating at its one end with said vent chamber and at its other end with the tank interior in the normal lower portion thereof, both said conduits having vertical portions extending to and between the normal upper and lower portion of the tank to limit loss of liquid through said vent chamber and having horizontal portions extending substantially the full length of the tank.

7. A tank in a liquid circulating system, said tank having normal upper and lower portions, a liquid inlet to the tank, a liquid outlet therefrom, a vent chamber in direct communication with the exterior of the tank and closed from direct communication with the interior of the tank, conduit means relatively stationarily installed in said tank, including a conduit communicating at its one end with said vent chamber and extending from said vent chamber through two horizontal and two vertical traversals of the tank interior with the opposite end terminating in the normal upper portion of the tank interior to vent said upper portion, and another conduit extending from said vent chamber to the normal lower portion of the tank to vent said normal lower portion and including a horizontally extending portion of appreciable length.

References Cited in the file of this patent

UNITED STATES PATENTS

| | | |
|---|---|---|
| 376,163 | Ross et al. | Jan. 10, 1888 |
| 2,404,765 | Valentyne | July 23, 1946 |
| 2,676,708 | Risk | Apr. 27, 1954 |
| 2,774,365 | Stewart | Dec. 18, 1956 |
| 2,793,708 | Carroll | May 28, 1957 |